United States Patent
Gundu

(10) Patent No.: US 9,485,686 B2
(45) Date of Patent: Nov. 1, 2016

(54) RESTRUCTURING DATA PACKETS TO IMPROVE VOICE QUALITY AT LOW BANDWIDTH CONDITIONS IN WIRELESS NETWORKS

(75) Inventor: Veerabhadra Gundu, Sunnyvale, CA (US)

(73) Assignee: Sonim Technologies, Inc., San Mateo, CA (US)

( * ) Notice: Subject to any disclaimer, the term of this patent is extended or adjusted under 35 U.S.C. 154(b) by 1072 days.

(21) Appl. No.: 11/367,560

(22) Filed: Mar. 3, 2006

(65) Prior Publication Data
US 2006/0199594 A1 Sep. 7, 2006

Related U.S. Application Data

(60) Provisional application No. 60/658,923, filed on Mar. 4, 2005.

(51) Int. Cl.
*H04W 72/00* (2009.01)
*H04W 28/06* (2009.01)
*G10L 19/16* (2013.01)
*H04L 12/64* (2006.01)
*H04L 29/06* (2006.01)
(Continued)

(52) U.S. Cl.
CPC ............ *H04W 28/06* (2013.01); *G10L 19/167* (2013.01); *H04L 12/6418* (2013.01); *H04L 65/4061* (2013.01); *H04L 65/608* (2013.01); *H04L 65/80* (2013.01); *H04L 65/1016* (2013.01); *H04L 2012/6481* (2013.01); *H04W 4/10* (2013.01); *H04W 76/005* (2013.01)

(58) Field of Classification Search
CPC ... H04W 28/06; H04W 4/10; H04W 76/005; H04L 65/1016; H04L 65/4061; H04L 65/608; H04L 65/80; H04L 12/6418; H04L 2012/6481

USPC .......... 455/450, 452.1–452.2; 370/235, 252, 370/352
See application file for complete search history.

(56) References Cited

U.S. PATENT DOCUMENTS

| 6,680,922 | B1 | 1/2004 | Jorgensen | |
| 6,798,786 | B1* | 9/2004 | Lo et al. | 370/468 |
| 7,191,242 | B1* | 3/2007 | Serenyi | H04L 29/06 709/217 |

(Continued)

OTHER PUBLICATIONS

International Search Report mailed Aug. 24, 2007, re PCT/2006/007713.

(Continued)

*Primary Examiner* — Wayne Cai
(74) *Attorney, Agent, or Firm* — Rahman LLC

(57) ABSTRACT

Methods and client devices for transmitting data packets based on audio input from a client device to a communications network in a communication session by receiving audio input on the client device; encoding audio input into audio frames comprising audio data indicative of the audio input; measuring bandwidth utilization of the communications network; removing a portion of the audio data if the bandwidth utilization is above a first pre-determined threshold; grouping the audio frames into data packets; and transmitting the data packets over the communications network. Alternate embodiments for removing portions of the audio data include removing at least one audio frame from each of a selected set of the plurality of data packets. Additional embodiments for removing portions of the audio data include removing a set of least significant bytes from each of a selected set of audio frames.

16 Claims, 8 Drawing Sheets

(51) Int. Cl.
*H04W 4/10* (2009.01)
*H04W 76/00* (2009.01)

(56) References Cited

U.S. PATENT DOCUMENTS

| | | | |
|---|---|---|---|
| 7,394,410 B1 * | 7/2008 | Wegener | H03M 7/30 341/50 |
| 2002/0143939 A1 * | 10/2002 | Riddle et al. | 709/224 |
| 2002/0184373 A1 | 12/2002 | Maes et al. | |
| 2003/0012149 A1 | 1/2003 | Maggenti et al. | |
| 2003/0016630 A1 * | 1/2003 | Vega-Garcia | H04L 29/06 370/252 |
| 2004/0090968 A1 * | 5/2004 | Kimber et al. | 370/395.54 |
| 2004/0120474 A1 | 6/2004 | Lopponen et al. | |
| 2004/0228326 A1 * | 11/2004 | Pearson | H04L 29/06027 370/352 |
| 2004/0240436 A1 * | 12/2004 | Yao | G10L 19/002 370/352 |
| 2006/0133276 A1 * | 6/2006 | Cole | H04L 29/06027 370/235 |

OTHER PUBLICATIONS

Written Opinion of the International Searching Authority mailed Aug. 24, 2007, re PCT/2006/007713.
International Preliminary Report on Patentability (IPRP) re PCT/2006/007713 mailed Sep. 18, 2007.

* cited by examiner

RESTRUCTURING DATA PACKETS TO IMPROVE VOICE QUALITY AT LOW BANDWIDTH CONDITIONS IN WIRELESS NETWORKS

PRIORITY CLAIM TO PROVISIONAL APPLICATION

A claim for priority is hereby made under the provisions of 35 U.S.C. §119 for the present application based upon U.S. Provisional Application No. 60/658,923, filed on Mar. 4, 2005, which is incorporated herein by reference.

BACKGROUND

Mobile cellular communication is evolving beyond traditional voice telephony towards more sophisticated services, such as Push-To-Talk (PTT). Similar to conventional walkie-talkie communication, PTT enables mobile communication users to send a voice message to one or more recipients over a mobile phone by simply pushing a key (i.e., PTT button, etc.).

One particular version of PTT, called PTT-over-Cellular (PoC), has started to be implemented in wireless data networks such as GSM/GPRS, EDGE, UMTS and CDMA cellular networks. By using internet protocols (i.e., an internet protocol network), these networks can provide a packet-based data service that enables information to be sent and received across a mobile telephone network. In addition, the use of internet protocols also facilitates PoC through the use of instant connections. That is, information can be sent or received immediately as the need arises, subject to available time slots at the air interface.

PTT, including PoC-based PTT, is half-duplex. That is, all participants typically use a single frequency or channel for both transmission and reception. Either a participant speaks or listens, but not both. This is in contrast to traditional cellular communication that is full-duplex (e.g., like a regular wired phone), in which at least one channel or frequency is assigned to talk, and another separate one is assigned to listen such that both speaking and listening can occur simultaneously.

For audio/video data transmissions, PoC applications require the transmission of signaling packets using a signaling protocol, e.g., Session Initiation Protocol (SIP), and data packets using a data protocol, e.g., Real Time Protocol (RTP). SIP is a signaling protocol for Internet conferencing, telephony, presence, events notification, and instant messaging. RTP is an Internet-standard protocol for the transport of real-time data, including audio and video media. It can be used for media-on-demand as well as interactive services such as Internet telephony. RTP consists of a data and a control part. The latter is called Real Time Control Part (RTCP).

Currently when using PoC, there is no indication to the talking user of the quality of the outgoing voice burst. The talking user thinks his voice being received properly, until he receives a response from the listening user. Since only one user can speak at a time, there is no way of confirming the quality of service of the system until the user releases the channel and the listener replies. Even a minor degradation of network bandwidth can cause voice quality issues. The methods of the present invention involve restructuring voice data packets in such a way as to minimize the impact of this degradation. For most companies trying to implement 3GPP/3GPP2 based voice application requirements on handsets, voice quality can be enhanced by this mechanism.

PoC may be implemented over a variety of access networks, including GPRS according to 3GPP Release 97/98, EGPRS according to 3GPP Release 99 or later releases, and UMTS according to Release 99 or later releases. For these networks, a PoC implementation preferably follows these recommendations:

The PoC implementation should work in an access network that delivers a throughput of 7.2 kbps or more.

The QoS (Quality of Service) profile parameters should be set such that the Radio Link Control (RLC) uses an acknowledged mode of operation.

If streaming traffic class is supported by the access network, PoC should use this traffic class for the exchange of RTP/RTCP data.

The POC client should support Adaptive Multi Rate (AMR) 5.15 as the mandatory and default CODEC, with optional support of AMR 4.75 being desirable. The support of any other AMR CODEC is at design discretion.

The AMR payload format should use the octet-aligned mode (byte aligned) without interleaving and without CRCs.

If traffic class streaming can be supported in the GPRS network, then an interactive traffic class Packet Data Protocol (PDP) context is preferably used for SIP and HTTP signaling; and a streaming traffic class PDP context is preferably used for the RTP/RTCP packets. If streaming is not available, then either two interactive PDP contexts may be used (one interactive PDP context intended for PoC signaling and one interactive PDP context for RTP media), or a single PDP context may be used for both PoC signaling and RTP media.

In order to ensure optimal service quality for PoC in GPRS networks, the QoS profile parameter values are carefully selected by the user equipment (UE) in PDP context activation requests. Since 3GPP Release 97/98 compliant networks do not provide support for a streaming traffic class, a QoS profile of a single PDP context may be shared between PoC signaling and media flows.

If using a dedicated PDP context for RTP/RTCP media, this context should be set up before or at the time of the first talk session. The RTCP traffic may be transported on the same PDP context as the SIP/HTTP signaling.

When a single PDP context is shared between media and signaling, PoC proposes some QoS parameter settings that express a compromise between satisfying different transport requirements of signaling and voice media flows to ensure the best possible overall service quality for PoC. But using traffic class streaming does not fully solve the problem. The GPRS network cannot differentiate among the various types of frames within RTP packets and the stability of multiple streams cannot be guaranteed. Also, actual bandwidth in the GPRS network can fluctuate, making scheduling and prioritization of packets important to ensure a good user experience.

Since even the best GPRS network is not able to guarantee any throughput to the UE, the PoC service quality can only be ensured if the radio access network is appropriately dimensioned. The following configurative means are available to improve the performance of the PoC service:

Radio channels can be assigned exclusively to PS data traffic (to avoid pre-emption by CS flows).

The maximal number of PS users multiplexed on the same timeslot (separate for UL and DL) can be limited.

The weight assigned to the priority level (related to the Precedence Class parameter value) of the PoC flow can be augmented.

UDP/IP header compression (RFC2507) can be configured to reduce the required radio link capacity.

If the underlying access network supports traffic class streaming, the secondary PDP context is to be used for the media (voice) flows of the PoC application. In addition, the following configurative means are available to improve the performance of the PoC service:

UDP/IP header compression (RFC2507) or RTP/UDP/IP header compression (RFC3095) can be configured to reduce the required radio link capacity.

Delayed release of DL Temporary Block Flows (TBFs) and Extended TBF Mode in UL (available for 3GPP Release 4 compliant networks only) can be configured to preserve the TBF over a longer period of time.

PoC is discussed in greater detail in the following technical specifications which are incorporated by reference: PoC, Architecture, PoC Release 2.0, V2.0.8 (2004-06); PoC, Signaling Flows—UE to Network Interface (UNI), PoC Release 2.0, V2.0.6 (2004-06); and PoC User Plane, Transport Protocols, PoC Release 2.0, V2.0.8 (2004-06). Of note, Release 1.0 is also available from the PoC Consortium as well as an upcoming PoC standard from Open Mobile Alliance (OMA).

In summary, where PTT applications operate in a limited bandwidth environment such as cellular networks, voice quality is diminished resulting in a poor user experience regardless of the type of packet compression in use. The present invention addresses this problem.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

One aspect of the present invention advantageously provides for strategically minimizing the size of data packets during PTT sessions.

An exemplary embodiment of the invention includes a method for minimizing the size of data packets during a push-to-talk session by reducing the number of audio frames in the talk burst and repackaging the data packets, and a method for reducing data packet size by removing the least significant bits from the audio frames. Either method may be employed to reduce data packet size, but both methods may not be employed simultaneously. In another aspect of this embodiment is a method of determining uplink bandwidth through foru different indicators: IP Buffer length indication, QoS degradation indication from the network, RTCP receiver reports, and Packet Sent indication.

Advantages of this exemplary embodiment include an effective method for reducing the size of data packets to increase voice quality and enhance PTT user experience in low bandwidth radio conditions.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
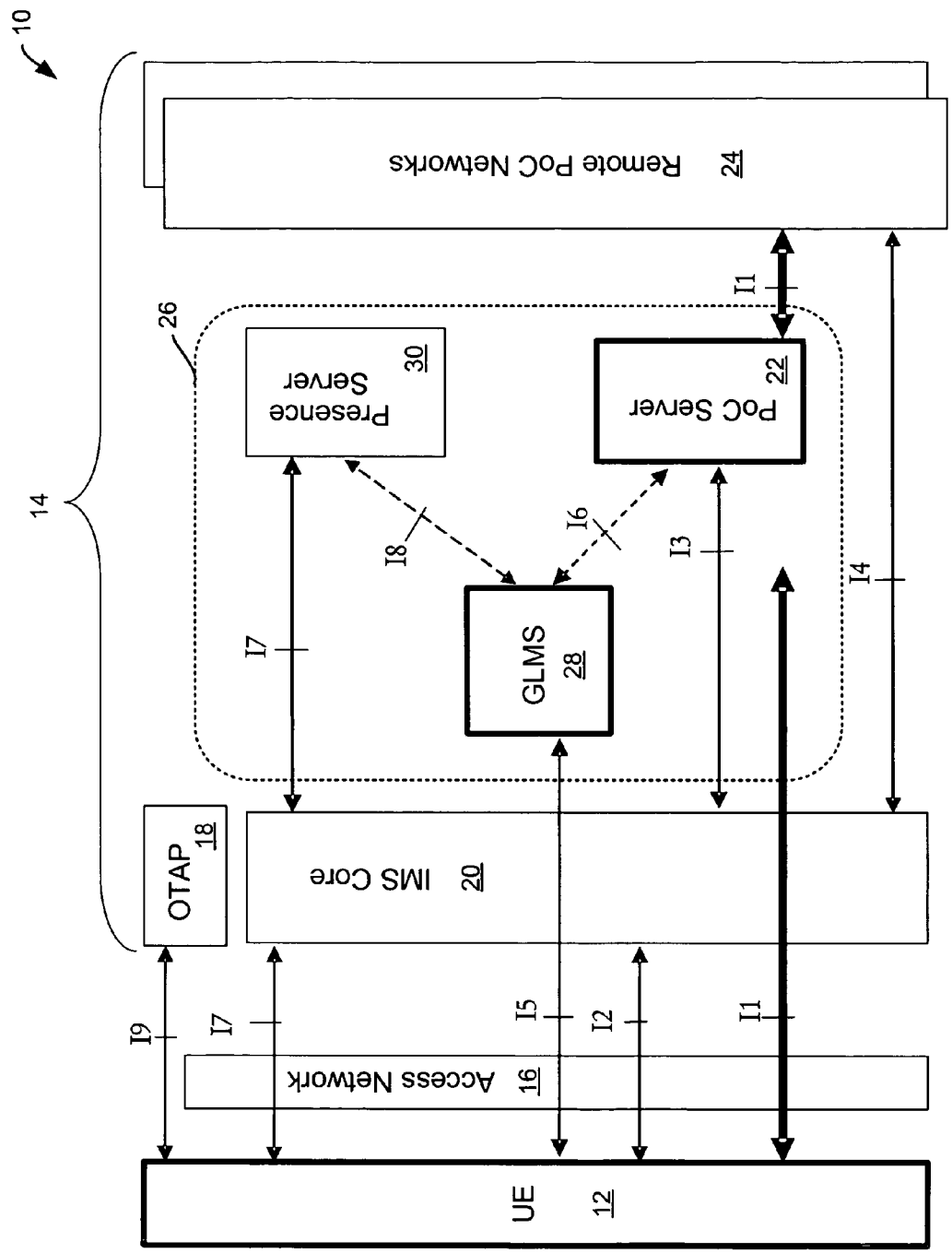
FIG. 1 is a block diagram of an exemplary PoC system architecture in accordance with PoC Consortium specifications.

The invention is described with reference to specific architectures and protocols. Those skilled in the art will recognize that the description is for illustration and to provide the best mode of practicing the invention. The description is not meant to be limiting. For example, reference is made to SIP and RTP Protocol but other protocols can be used in the invention. Likewise, reference is made to PoC applications, while other types of wireless transmissions including Voice Over IP (VOIP) can be used in the embodiments of the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

A. Overview

The present invention is described in the exemplary context of PoC applications that use SIP signaling protocol and RTP for audio/video data transmissions. As discussed in the Background section, PoC may be implemented with or without traffic class streaming. The present invention is still beneficial when traffic class streaming is in use. With or without traffic class streaming, the PoC implementation of the preferred embodiment is applicable to an access network that delivers a throughput of 7.2 kbps or more and should support AMR 5.15 as the default CODEC. Table 1 below describes the bandwidth consumption required for AMR 5.15 with robust header compression (ROHC) and without.

An AMR-NB (Adaptive Multi Rate-Narrow Band speech CODEC) is used to compress the toll quality speech (8000 samples/second). This speech coder is mainly used for speech compression in 3rd generation mobile telephony. This CODEC has eight basic bit rates, 12.2, 10.2, 7.95, 7.40, 6.70, 5.90, 5.15, and 4.75 Kbit/s. This CODEC works on the principle of Algebraic Code Excited Linear Prediction (ACELP) for all bit rates. To reduce average bit rate, this CODEC supports the discontinuous transmission (DTX), using Voice Activity Detection (VAD) and Comfort Noise Generation (CNG) algorithms. The eight AMR CODEC bit-rates (modes) are denoted with indices 0 to 7 where 0 maps to 4.75 kbit/s mode and 7 maps to 12.2 kbit/s mode.

AMR is discussed in greater detail in the following technical specifications: TS 26.090: "AMR Speech CODEC; Speech Transcoding Functions", TS 26.093: "AMR Speech CODEC; Source Controlled Rate Operations", and TS 26.092: "AMR Speech CODEC; ort Noise Aspects."

TABLE 1

Bandwidth Consumption for AMR5.15

| Number of frames per RTP packet | Bandwidth consumption [kbps] AMR5.15, IPv4, No ROHC | Bandwidth consumption [kbps] AMR5.15, IPv4, ROHC |
| --- | --- | --- |
| 1 | 22.0 | 7.2 |
| 2 | 13.8 | 6.4 |
| 3 | 11.1 | 6.1 |
| 4 | 9.7 | 6.0 |
| 6 | 8.3 | 5.9 |
| 8 | 7.7 | 5.8 |
| 12 | 7.0 | 5.7 |
| 16 | 6.6 | 5.7 |

Table 1 displays the number of frames per packet for the various bandwidth amounts for the AMR5.15 CODEC with and without ROHC. As shown above, in most cases, wireless systems will put 12 to 16 frames per RTP packet for a throughput of 7.2 kbps (minimum required by PoC) without ROHC compression, but there may be as few as 1 frame per RTP packet for the same throughput if using ROHC compression. This specification uses the example of 12 frames per RTP packet in describing the present invention as this represents the most widely used setting.

The PoC system establishes the AMR RTP payload attributes and mode-set when the PTT session is created. This determines how many frames will actually be packaged into each RTP packet during the PTT session. The PoC system preferably supports the default CODEC, AMR5.15 and also other AMR modes if possible. The AMR modes are one of the eight AMR CODEC bit-rates denoted with indices 0 to 7 where 0 maps to 4.75 kbit/s mode and 7 maps to 12.2 kbit/s mode. The mode-set may be re-negotiated during a PTT session. This allows a change in the number of frames per RTP packet if more bandwidth becomes available. The AMR payload format should use the octet-aligned mode (byte aligned) without interleaving and without CRCs. A Cyclic Redundancy Check (CRC) is used to protect Frames. The transmitter appends an extra n-bit sequence to every frame called a Frame Check Sequence (FCS). The FCS holds redundant information about the frame that helps the transmitter detect errors in the frame.

The AMR parameters that are negotiated in the PTT session establishment are mode-set, ptime, maxptime, and octet-aligned. The 'maxptime' parameter, which is signaled by the PoC client device, user equipment (UE), indicates the maximum amount of media that can be encapsulated in a payload packet and is expressed as time in milliseconds. The 'maxptime' value takes into account any network delays. After SDP negotiation, the decoding the UE is able to unpack RTP packets containing any number of frames up to 'maxptime'.

The amount of media that is encapsulated in a payload packet is signaled by the 'ptime' value. The value is determined by the number of frames per RTP packet multiplied by 20 ms per frame to give the interval in milliseconds that represents the amount of media which can be encapsulated in an RTP payload packet. During the talk session, the UE is able to accept SDP re-negotiations of 'ptime' up to the negotiated 'maxptime'. The encoding UE may pack fewer frames into the last RTP packet of the talk burst, regardless of what has been defined during session negotiation or adaptation.

The AMR CODEC mode used for encoding each frame is signaled with the Frame Type (FT) index in the payload table of contents. Below, Table 2 defines the various Frame Types found in RTP packets.

TABLE 2

Frame Types

| Frame Type | Mode Indication | Mode Request | Frame content (AMR mode, comfort noise, or other) | # of bits in Frame Type | # of bits in AMR core Frame | # of bits in Bit Stuffing | # of octets |
|---|---|---|---|---|---|---|---|
| 0 | 0 | 0 | AMR 4.75 kbit/s | 4 | 95 | 5 | 13 |
| 1 | 1 | 1 | AMR 5.15 kbit/s | 4 | 103 | 5 | 14 |
| 2 | 2 | 2 | AMR 5.90 kbit/s | 4 | 118 | 6 | 16 |
| 3 | 3 | 3 | AMR 6.70 kbit/s (PDC-EFR) | 4 | 134 | 6 | 18 |
| 4 | 4 | 4 | AMR 7.40 kbit/s (TDMA-EFR) | 4 | 148 | 0 | 19 |
| 5 | 5 | 5 | AMR 7.95 kbit/s | 4 | 159 | 5 | 21 |
| 6 | 6 | 6 | AMR 10.2 kbit/s | 4 | 204 | 0 | 26 |
| 7 | 7 | 7 | AMR 12.2 kbit/s (GSM-EFR) | 4 | 244 | 0 | 31 |
| 8 | - | - | AMR SID | 4 | 39 | 5 | 6 |
| 9 | - | - | GSM-EFR SID | 4 | 43 | 1 | 6 |
| 10 | - | - | TDMA-EFR SID | 4 | 38 | 6 | 6 |
| 11 | - | - | PDC-EFR SID | 4 | 37 | 7 | 6 |
| 12 | - | - | For future use | - | - | - | - |
| 13 | - | - | No Data (No transmission/No reception) | 4 | 0 | 4 | 1 |

Most Likely Choice for these Networks: GPRS → 1; EDGE → 3, 4; 3G → 7. Silence Frames: 8–11. No Data Frame: 13.

In the above, the Frame Types 0 to 7 are the frame types for speech bits and Frame Type 15 is a No Data frame. Different networks will use different Frame Types. For example, a GPRS network is likely to use Frame Type 1, an Edge network is likely to use Frame Type 3 or 4, and a 3G network is likely to use Frame Type 7.

The methods of the present invention assume that uplink bandwidth is being monitored by the modem and being reported by the modem to the PoC Client. There are four possible standard real-time indicators of uplink bandwidth strength currently used by those proficient in the art:

IP Buffer Length indication—for each RTP packet transmission, the platform will send information about the current IP Buffer length. For each packet transmission, a comparison is made between the current length value and the previous length value to gain a measurement of the uplink bandwidth.

QoS degradation indication—if network conditions degrade, the server can degrade the QoS for the PTT application. The UE uses the current QoS to determine the number of frames to include in each packet. The QoS value will be reevaluated by the server on a regular basis and changed as needed.

Packet Sent indication—the UE tags each packet and stores the information in memory. When the modem sends the packet, it also sends a notification back to the client, which includes a timestamp. The client can calculate bandwidth based on the packet size and the time it took to get the packet sent and alter packet size accordingly.

RTCP Receiver Reports—the PTT server or receiving UE may send back a report to the transmitting UE on how many packets that were received over a certain time span, e.g. audio (or voice) burst.

When any of these bandwidth indictors are implemented, the modem will send bandwidth measurement data to the UE. This data is used to determine how large the RTP packets shall be when using one of the two methods discusses in this specification.

In summary, where PTT applications operate in a limited bandwidth environment such as cellular networks, voice quality is diminished resulting in a poor user experience regardless of the type of packet compression in use. The present invention addresses the problem through two distinct methods. Either method may be implemented, but they cannot be implemented together. The first method involves selectively dropping audio frames and repackaging the data packets, allowing the receiving UE to extrapolate the contents of the missing frames. The second method involves dropping the least significant bits from the audio frames. This second method only applies to AMR CODECs while the first method applies to all CODECs.

B. Architecture

FIG. 1 illustrates the system 10 of the preferred embodiment as well as the interfaces for messages transmitted between the UE 12 and various components of the PoC system 14. The system 10 includes UE 12, access network 16, Over the Air Provisioning (OTAP) server 18, IMS Core 20, PoC servers 22, and remote PoC networks 26. Access network 16 is the communications network for connecting UE 12 to the PoC system 14. In the case of a PoC system 14 (i.e., PTT-over-cellular), the access network 16 is a cellular network. The OTAP server 18 performs the following functions that are needed in support of the PoC service: provides all the needed configuration parameters from the service provider access network 16 for a PoC client (i.e., UE 12), and sends a WAP-push/SMS containing a binary coded XML to every client UE 12 with default factory and network settings.

The PoC services 26 include Group List Management Server (GLMS) 28, PoC server 22, and Presence Server 30. As would be obvious to those of ordinary skill in the art, the PoC services 26 may be implemented in a single physical server, in multiple physical servers for each function, or any combination thereof.

C. Data Packet Size Reduction Process

Figure 2:
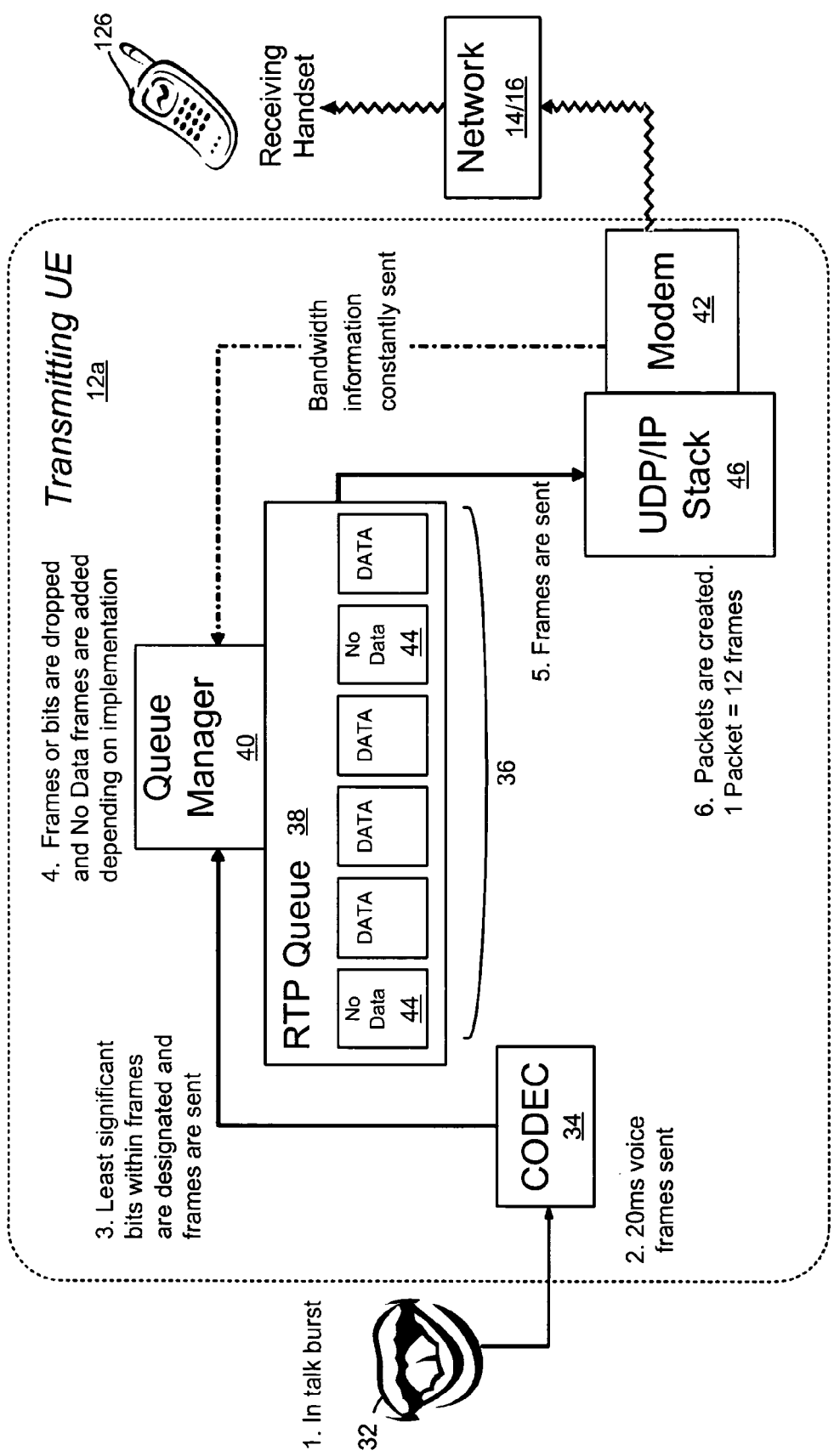
FIG. 2 is a combination block diagram and flowchart of the process flow voice data packets under control of the Queuing Manager in accordance with embodiments of the present invention.

FIG. 2 is a combination block diagram and flowchart of the process flow voice data packets under control of the Queuing Manager 40 in accordance with embodiments of the present invention. When user 32 speaks, audio input is received by transmitting UE 12a and is initially sent to CODEC 34 as audio frames having a 20 ms duration. CODEC 34 designates which bits within the frames 36 are the least significant bits and sends the frames 36 to the RTP Queue 38. Queue Manager 40 analyzes the contents of the RTP queue 38 according to the method being implemented (i.e., frame removal or byte removal) in preparation for transmitting the frames. In addition, Queue Manager 40 receives constant information from the modem 42 as to current bandwidth conditions.

Frame Removal

If a voice frame removal method is implemented, Queue Manager 40 selects which audio (or voice) frames 36 to remove based on the uplink bandwidth utilization conditions received from modem 42. The poorer the network conditions, the more audio frames are dropped. In one embodiment, CODEC 34 has a 3-frame memory built into it that can be utilized by the Queue Manager 40 when determining how often to drop a frame. The Queue Manager 40 then inserts "No Data" frames 44 into vacated slots. Queue Manager 40 then sends the audio frames to UDP/IP Stack 46 for grouping into data packets. In this example, fewer data packets may be sent due to the reduction in audio frames. Data packets may then be sent over network 14/16 (PoC system 14 and access network 16) to receiving handset 126. In one embodiment, one data packet is comprised of a group of 12 audio frames.

Byte Removal

If the method being implemented involves removing the least significant bits from the audio (or voice) frames 36, the Queue Manager 40 removes those bits. This shrinks the audio frame size resulting in a correspondingly smaller data packet size. Queue Manager 40 then sends the audio frames to UDP/IP Stack 46 for grouping into data packets. In this example, smaller data packets may be sent due to the reduction in audio frame size. Data packets may then be sent over network 14/16 (PoC system 14 and access network 16) to receiving handset 126. In one embodiment, one data packet is comprised of a group of 12 audio frames.

Figure 3:
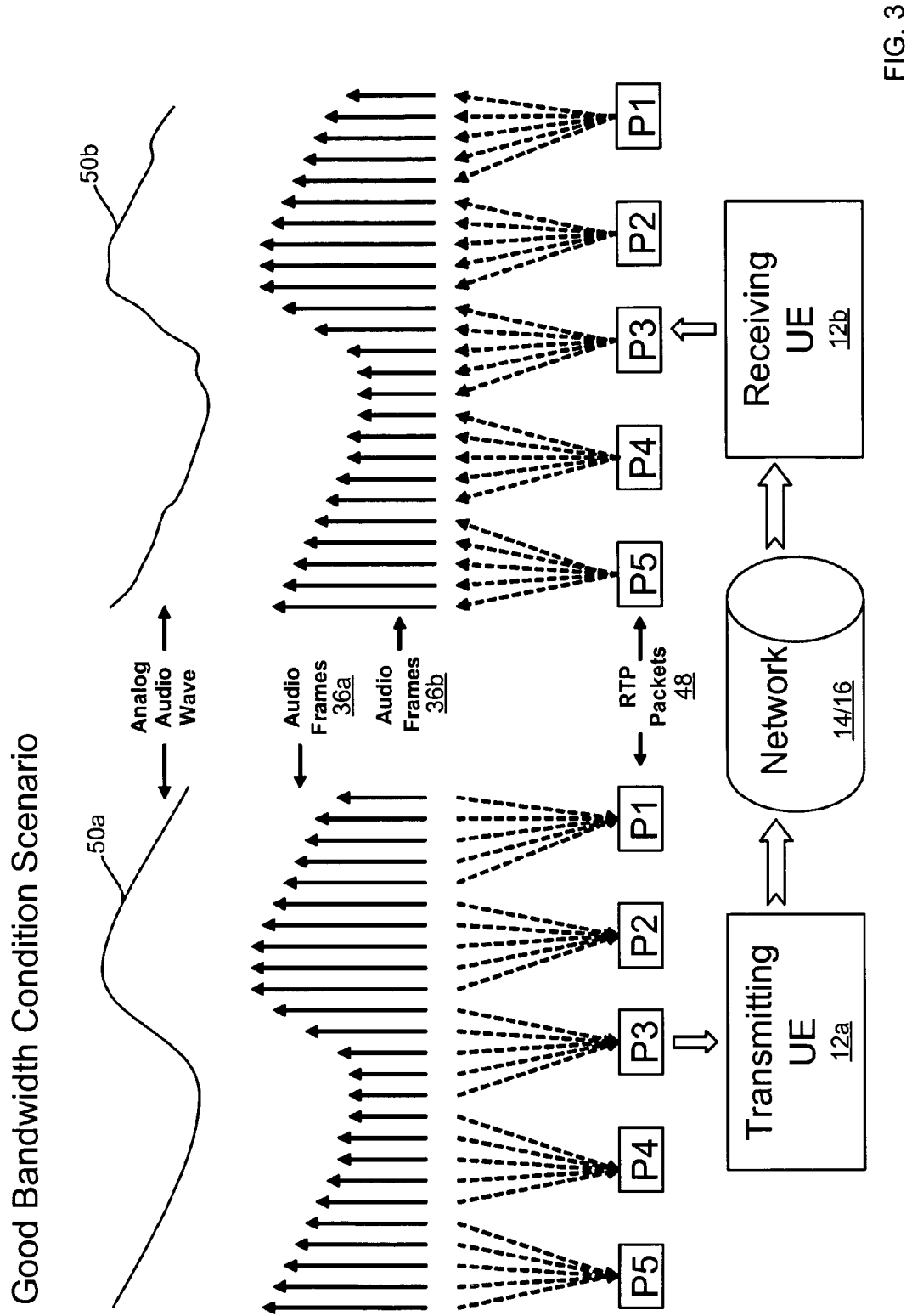
FIG. 3 is a block diagram illustrating the transmission of exemplary voice bursts over good bandwidth conditions.

FIG. 3 is a block diagram illustrating the transmission of exemplary voice bursts over good bandwidth utilization conditions. Audio (or voice) frames 36a correspond to original analog wave 50a emitted by a user (i.e., user 32, FIG. 2). Original analog wave 50a is digitized by a CODEC to create corresponding audio frames 36a. Any CODEC well-known in the art may be utilized without departing from the present invention. Audio frames 36a may then be grouped into communication data packets such as RTP packets 48 (e.g. P1-P5) by, for example, a UDP/IP Stack as described in FIG. 2. RTP Packets 48 may then be transmitted from UE 12a over network 14/16 to a receiving UE 12b. Data packets are then ungrouped into audio frames 36b whereupon audio frames 36b may be decoded by a CODEC to be heard by a listener as transmitted analog wave 50b. Under good bandwidth utilization conditions, minimal distortion may be expected between original analog wave 50a and transmitted analog wave 50b.

Figure 4:
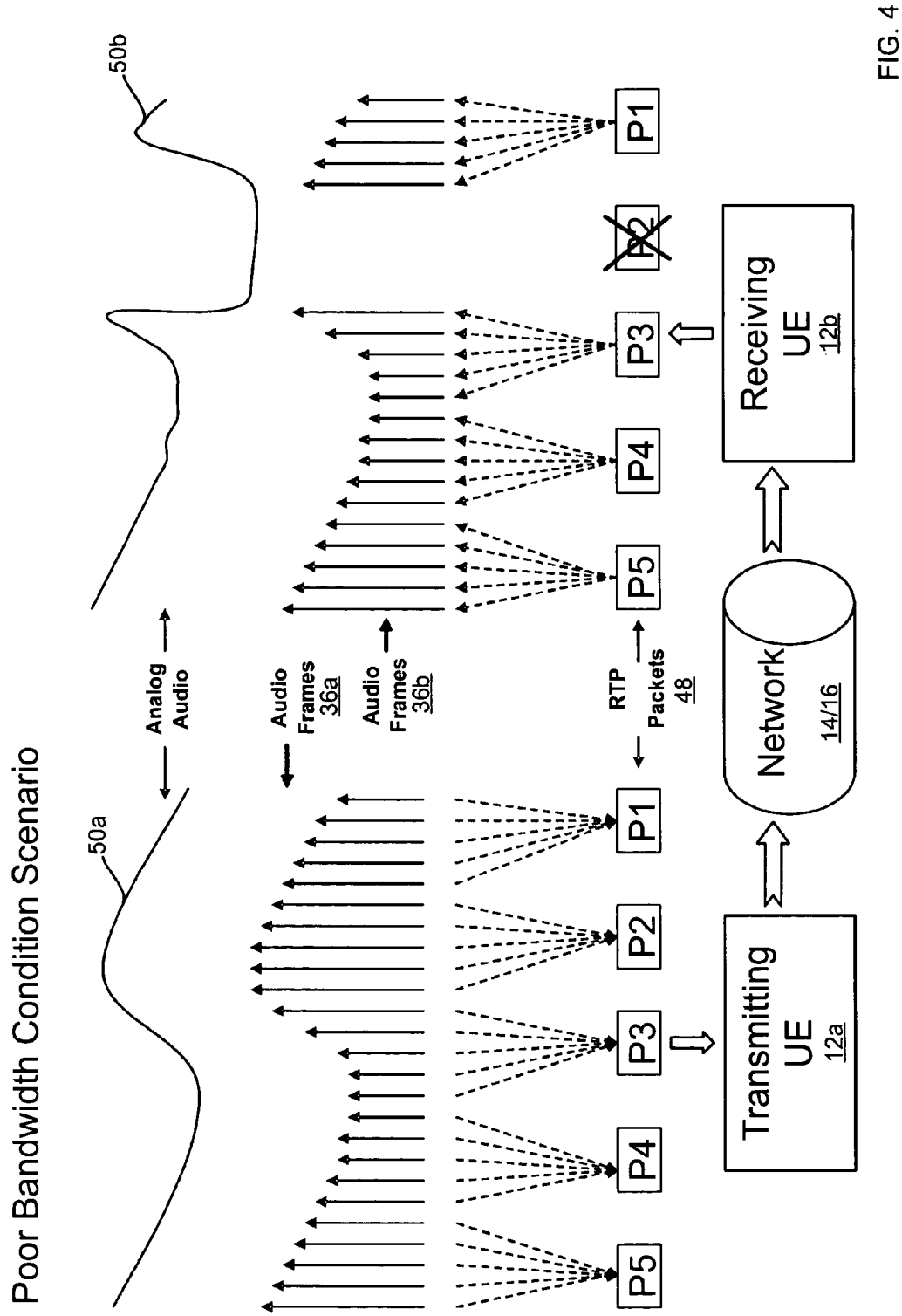
FIG. 4 is a block diagram illustrating the transmission of exemplary voice bursts over poor bandwidth without the benefit of the present invention.

FIG. 4 is a block diagram illustrating the transmission of exemplary voice bursts over poor bandwidth utilization conditions without the benefit of the present invention. In this example, data packet P2 is lost in transmission over the network 14/16. It may be appreciated that data packets may be lost for any number of reasons well-known in the art. When a data packet is lost, a listener may experience a gap in audio (or voice burst) resulting in a poor user experience. Transmitted audio wave 50b illustrates the loss as a precipitous drop, followed by a zero state, which is in turn followed by a precipitous rise in the audio wave. In contrast, methods of the present invention may be utilized to enhance user experience by reorganizing data packets 48 so that complete data packets are never dropped even under poor network conditions.

Figure 5:
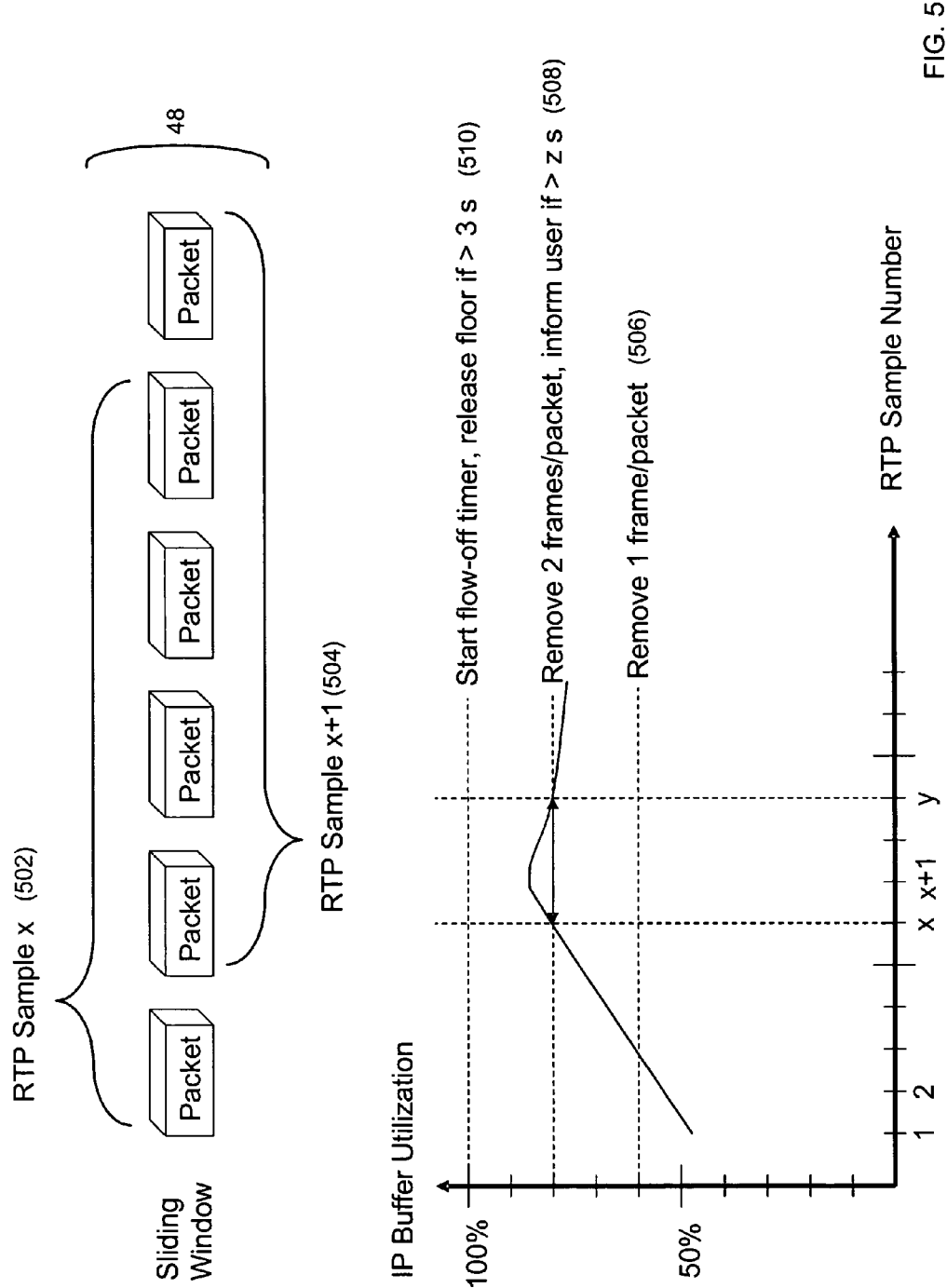
FIG. 5 is a block diagram illustrating a first method for restructuring voice data packets by puncturing RTP data packets in accordance with embodiments of the present invention.

One method for improving audio transmission under poor bandwidth conditions involves removing audio frames and repackaging data packets in such a way as to spread the loss of audio frames across one or more data packets in an audio (or voice) burst. FIG. 5 is a block diagram illustrating a first method for restructuring data packets by puncturing RTP data packets in accordance with embodiments of the present invention. This method utilizes IP buffer utilization as the metric for deciding whether available bandwidth is scarce and, as such, whether audio frame dropping is necessary. IP buffer utilization may be high for any number of reasons including poor network conditions or competing high-priority applications on same device, for example. In order to achieve a smooth reaction curve and to avoid removing audio frames unnecessarily, a sliding window may be utilized that includes a predefined number of data packet measurement points for the IP buffer to calculate an average value before triggering an audio frame reduction. For example, RTP Sample x (502) may be utilized to calculate a first average value. Thereafter, RTP Sample x+1 (504) may be utilized to calculate a second average value. The method may continue for any number of samples. By utilizing overlapping data packets in the calculation, the method may create a smoother reaction curve. Furthermore, the method can be made more responsive to change by utilizing fewer samples or less responsive to change by utilizing more samples.

Still further, a number of pre-determined thresholds may be defined. For example, a first pre-determined threshold may be configured to respond to 60% IP buffer utilization by removing one audio frame from each packet before transmission 506. In another example, a second pre-determined threshold may be configured to respond to 80% IP buffer utilization by removing two audio frames from each packet before transmission 508. Further, at an 80% IP buffer utilization level, Queue Manager 40 may provide a low-bandwidth notification message to inform the user that a critical bandwidth condition exists. In some embodiments, a temporal element, such as a pre-determined time period, may also be configured. That is, if a bandwidth utilization condition exists for longer than a specified pre-determined time period (e.g. z=3 seconds) the user may be prompted to decide whether to continue a talk burst 508. If, in another example, the IP buffer reaches a third pre-determined threshold such as 100% (i.e. full-utilization) 510, then a flow-off timer in Queue Manager 40 may be initiated wherein Queue Manager 40 will not release any more data packets 36 from RTP Queue 38 until the flow-off timer expires or the 100% utilization condition no longer exists. Thus, no additional data packets are sent to the IP buffer in UDP/IP stack 46 while a 100% bandwidth utilization condition exists. In still another example, where an IP buffer maintains a level of 100% for up to a specified pre-determined time period such as, for example, 3 seconds, a notification message may be provided by Queue Manager 40 recommending that the user cease talking and release the floor 510. It may be appreciated that the several bandwidth utilization parameters provided are for illustrative purposes only. As such, any number of parameters may be selected without departing from the present invention.

Figure 6:
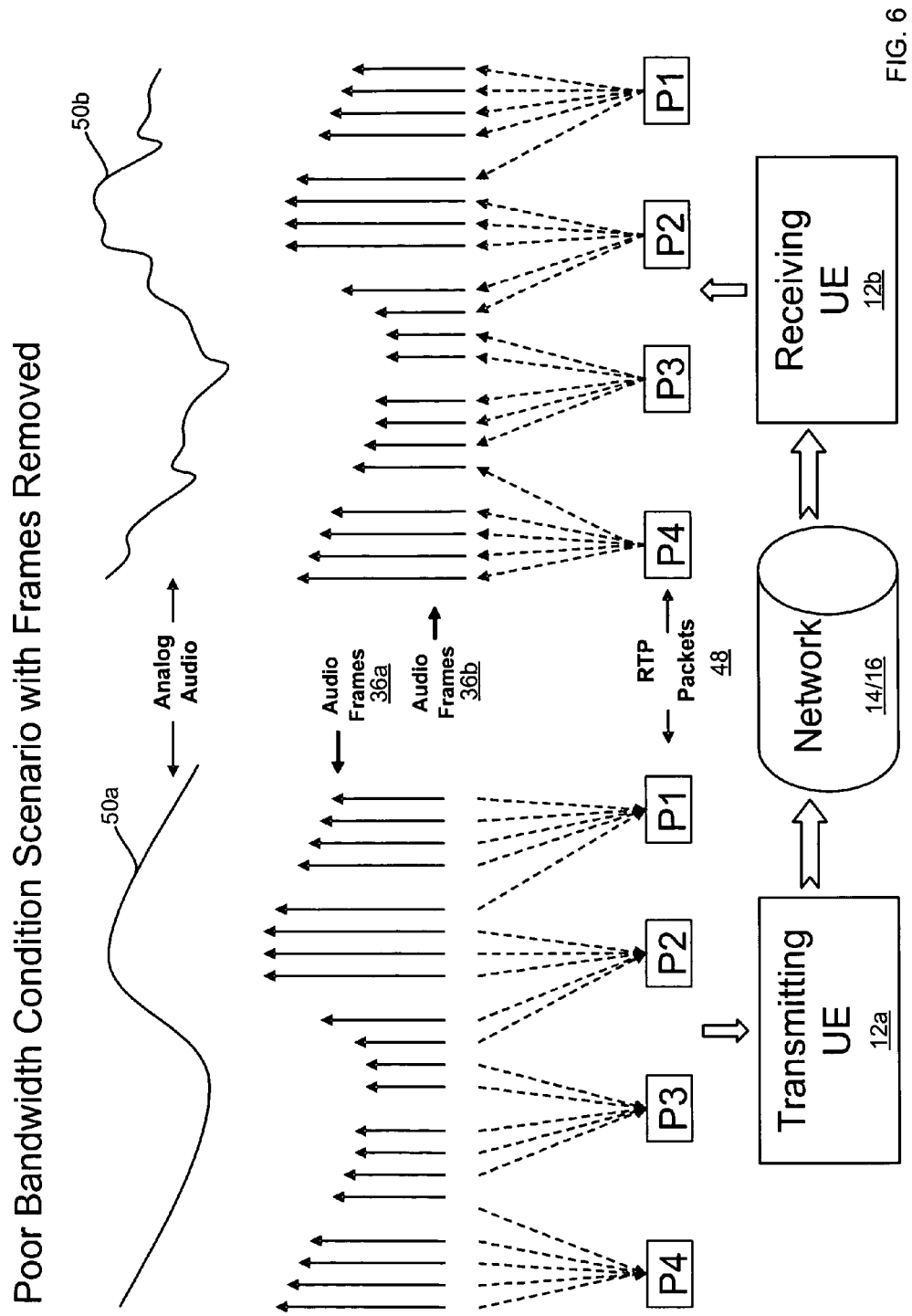
FIG. 6 is an illustrative representation of a poor bandwidth condition utilizing methods in accordance with embodiments of the present invention.

FIG. 6 is an illustrative representation of a poor bandwidth utilization condition utilizing methods in accordance with embodiments of the present invention. As illustrated, transmitted audio wave 50b more closely resembles original audio wave 50a as compared with audio wave depicted in FIG. 4. In this example, every 5$^{th}$ audio frame is dropped before the remaining audio frames are packaged into data packets. That is, in the embodiment illustrated, the method determines that poor network conditions exist that may result in a lost data packet (e.g. data packet P2, FIG. 4) whereupon some number of audio frames may be dropped and remaining audio frames are grouped in a manner that avoids a complete data packet loss having a contiguous group of original audio frames. Instead, a distributed portion of the original audio frames are removed thus yielding a more desirable result. In many examples, the loss of original audio frames 36a may not be readily discernable to a listener. IT may be appreciated that the shape of transmitted audio wave 50b more closely resembles the shape of original audio wave 50a than in the scenario depicted in FIG. 4. Thus a listener may hear a smoother audio (or voice burst) without obvious gaps.

In a similar manner, an embodiment may also be applied when using the QoS degradation indication as received from 3GPP Release 99 networks as input, when using RTCP Receiver Reports as input, or when using the packet sent indication as input. All of these data measurements can be utilized in a graph such as depicted in FIG. 5, where kbps replaces IP buffer utilization as the metric on the y-axis. In the case of packet sent indication, the throughput in kbps for every packet 48 is calculated by taking the size of the packet 48 and dividing it by the time it took to travel to the modem 42 and back again.

Figure 7:
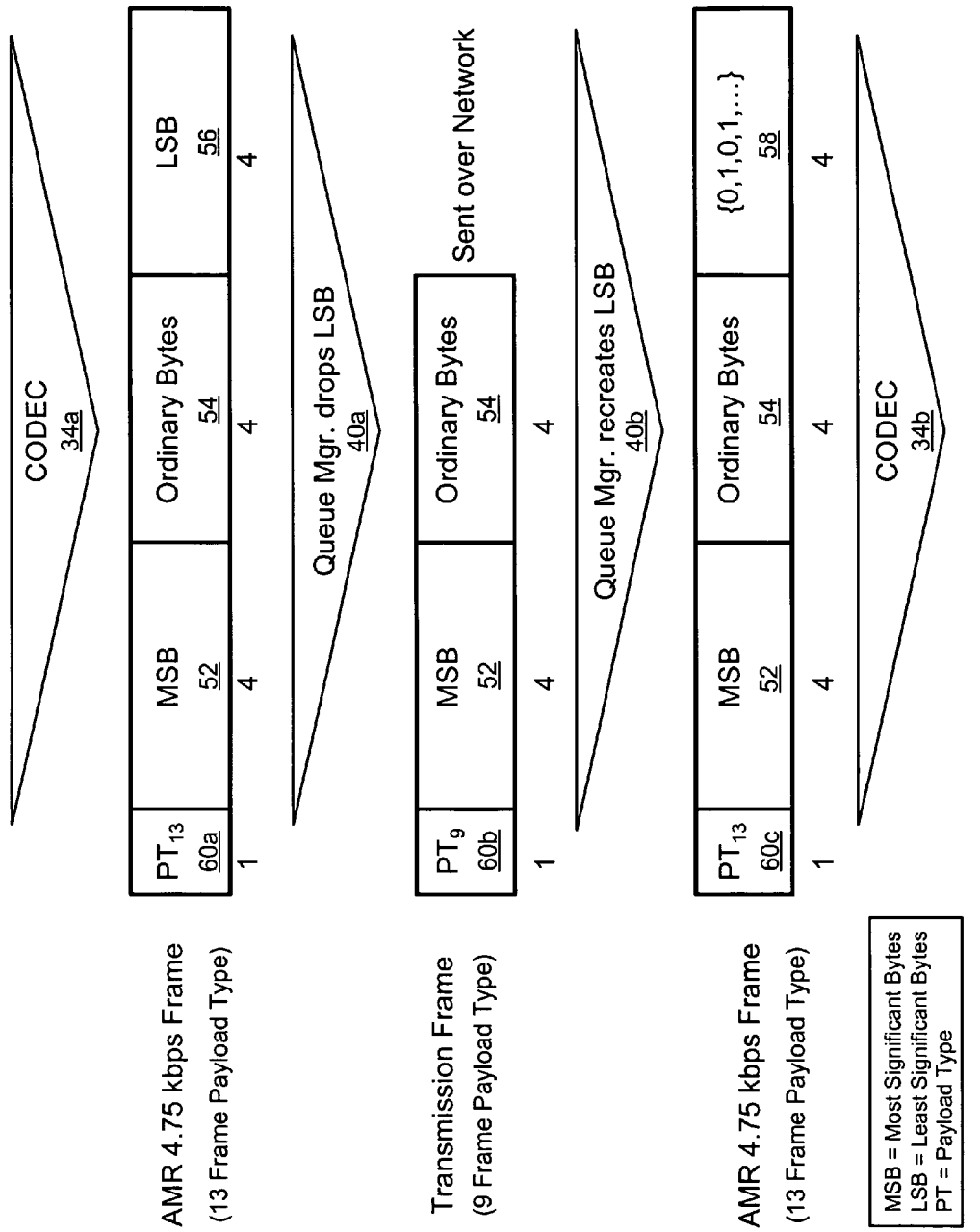
FIG. 7 is a block diagram illustrating a second method for restructuring voice data packets by removing least significant bytes in accordance with embodiments of the present invention.

FIG. 7 is a block diagram illustrating a second method for restructuring audio data packets by removing a set of least significant bytes in accordance with embodiments of the present invention. The method includes reducing each audio frame size by removing the Least Significant Bytes (LSB) from each audio frame 36. The triggering of this method is similar to that shown in FIG. 5, i.e. thresholds are set vis-à-vis the IP buffer utilization or measured kbps throughput. The difference lies in the method by which bandwidth utilization is accounted for.

Figure 8:
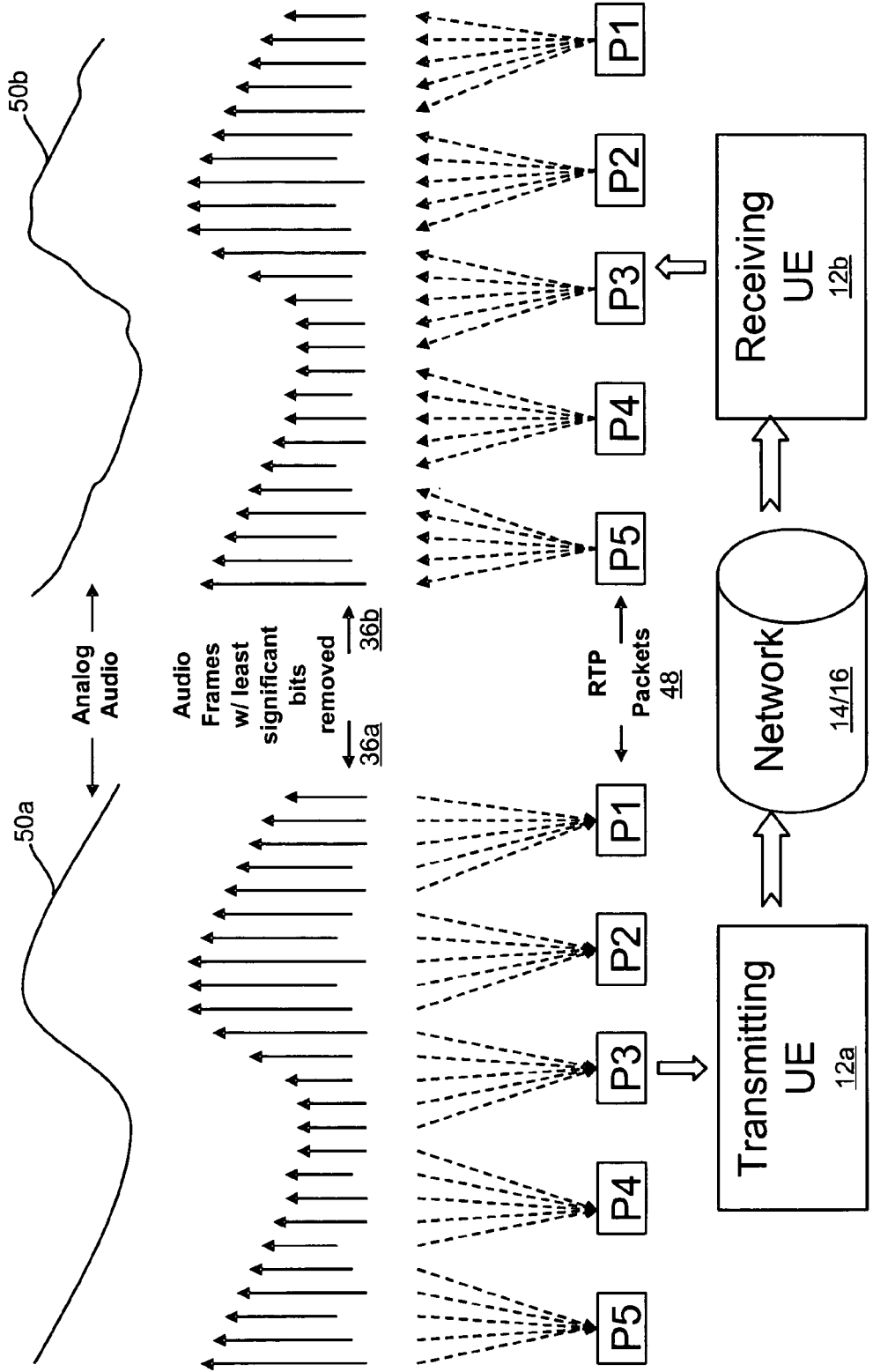
FIG. 8 is a block diagram illustrating the transmission of exemplary voice bursts over poor bandwidth using a second method in accordance with embodiments of the present invention.

In case of Adaptive Multi Rate (AMR), transmitting CODEC 34a (acting as an encoder) on a transmitting UE 12a marks and distinguishes between Most Significant Bytes (MSB) 52, Ordinary Bytes 54, and Least Significant Bytes (LSB) 56 based on captured voice samples. As such, the transmitting Queue Manager 40a may utilize this information to remove LSB 56 thus creating a new payload consisting of 9 bytes/frame instead of 13 bytes/frame. LSB may include, for example, off frequency signals that do not contribute to speech clarity. The 9 byte/frame payload 60b is transferred across the network 14/16 to the receiving UE 12b. Once receiving Queue Manager 40b receives the 9 byte/frame payload 60b, Queue Manager 40b augments the frame with dummy bits 58 in order to recreate a standard 4.75 kbps AMR Payload Type 60c having 13 bytes/frame. The recreated 13 bytes/frame payload 60c may then be processed by the receiving CODEC 34b (acting as a decoder). In this manner, a smaller data packet may be sent over the network 14/16 while preserving audio integrity. The resulting audio burst quality, as illustrated in FIG. 8 by transmitted audio wave 50b more nearly resembles original audio wave 50a. Thus, audio transmissions under poor bandwidth utilization conditions may be achieved that similar to audio transmissions under good bandwidth utilization conditions as illustrated in FIG. 3.

D. Conclusion

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for transmitting a plurality of real-time protocol (RTP) data packets based on an audio input from a first client device to a wireless communications network in a communication session, the method comprising:

receiving the audio input corresponding to a user on the first client device during the communication session;

encoding the received audio input into audio frames comprising audio data indicative of the audio input based on a set of parameters;

measuring a bandwidth utilization of the wireless communications network based on a real-time bandwidth indicator;

determining if the bandwidth utilization is above one of a first pre-determined threshold, a second pre-determined threshold and a third pre-determined threshold;

removing a portion of the audio data if the bandwidth utilization is above the first pre-determined threshold after encoding the audio input in response to measuring the bandwidth utilization, wherein removing the portion of the audio data comprises removing at least one audio frame, at least one of the audio frames, at least two of the audio frames and a set of least significant bytes;

creating a first notification message upon removing the at least two of the audio frames from the plurality of RTP data packets if the bandwidth utilization is above the second pre-determined threshold;

creating a second notification message if the bandwidth utilization is above the second pre-determined threshold for a pre-determined time period;

terminating transmission of the plurality of RTP data packets upon expiry of a flow-off timer if the bandwidth utilization is above the third pre-determined threshold;

creating a third notification message upon terminating the transmission of the plurality of RTP data packets if the bandwidth utilization is above the third pre-determined threshold;

grouping the audio frames into the plurality of RTP data packets upon removing the portion of the audio data; and transmitting the plurality of RTP data packets over the wireless communications network, wherein the communication session is selected from the group consisting of: a push-to-talk session, a push-to-talk over cellular session, and a voice over IP (VOIP) session.

2. The method of claim 1, wherein the at least one audio frame is from each of a selected set of the plurality of RTP data packets based on uplink bandwidth utilization condition.

3. The method of claim 1, wherein the removing the portion of the audio data comprises:

removing the at least one of the audio frames from the selected set of the plurality of RTP data packets if the bandwidth utilization is above the first pre-determined threshold; and removing the at least two of the audio frames from the selected set of the plurality of RTP data packets if the bandwidth utilization is above the second pre-determined threshold.

4. The method of claim 1, wherein the removing the portion of the audio data comprises removing the set of least significant bytes from each of a selected set of audio frames after encoding the audio input in response to measuring the bandwidth utilization.

5. The method of claim 1, further comprises:

creating a first notification message upon removing the set of least significant bytes from each of a selected set of audio frames if the bandwidth utilization is above a second pre-determined threshold;

creating a second notification message if the bandwidth utilization is above the second pre-determined threshold for a pre-determined time period;

terminating transmission of the plurality of RTP data packets upon expiry of a flow-off timer if the bandwidth utilization is above a third pre-determined threshold; and creating a third notification message upon terminating the transmission of the plurality of RTP data packets if the bandwidth utilization is above the third pre-determined threshold.

6. The method of claim 1, wherein the bandwidth utilization is measured based upon the real-time bandwidth indicator selected from the group consisting of: IP buffer length, QoS degradation, RTCP receiver reports, and packet sent indication data.

7. The method of claim 1, further comprises:

receiving the plurality of RTP data packets from the wireless communications network by a second client device;

augmenting the received plurality of RTP data packets with a plurality of dummy bits to reproduce the audio input;

decoding the plurality of RTP data packets into the audio frames based on the set of parameters; and reproducing the audio input based upon the audio frames on the second client device.

8. A client device for transmitting a plurality of RTP data packets based on an audio input over a RTP communications network during a communication session, the client device configured to:

receive the audio input corresponding to a user for transmission on the wireless communications network during the communication session;

encode the received audio input into audio frames comprising audio data indicative of the audio input based on a set of parameters;

measure a bandwidth utilization of the wireless communications network based on a real-time bandwidth indicator;

determine if the bandwidth utilization is above one of a first pre-determined threshold, a second pre-determined threshold and a third pre-determined threshold;

remove a portion of the audio data if the bandwidth utilization is above the first pre-determined threshold after encoding the audio input in response to measuring the bandwidth utilization, wherein removing the portion of the audio data comprises removing at least one audio frame, at least one of the audio frames, at least two of the audio frames and a set of least significant bytes;

create a first notification message upon removing at least two of the audio frames from the selected set of the plurality of RTP data packets if the bandwidth utilization is above the second pre-determined threshold;

create a second notification message if the bandwidth utilization is above the second pre-determined threshold for a pre-determined time period;

terminate transmission of the plurality of RTP data packets upon expiry of a flow-off timer if the bandwidth utilization is above the third pre-determined threshold;

create a third notification message upon terminating the transmission of the plurality of RTP data packets if the bandwidth utilization is above the third pre-determined threshold;

group the audio frames into the plurality of RTP data packets upon removing the portion of the audio data; and transmit the plurality of RTP data packets over the wireless communications network, wherein the communication session is selected from the group consisting of: a push-to-talk session, a push-to-talk over cellular session, and a voice over IP (VOIP) session.

9. The client device of claim 8, wherein the removing the at least one audio frame is from each of a selected set of the plurality of RTP data packets based on uplink bandwidth utilization condition.

10. The client device of claim 8, wherein the client device configured to remove the portion of the audio data by:

removing at least one of the audio frames from the selected set of the plurality of RTP data packets if the bandwidth utilization is above the first pre-determined threshold; and removing at least two of the audio frames from the selected set of the plurality of RTP data packets if the bandwidth utilization is above the second pre-determined threshold.

11. The client device of claim 8, wherein the client device configured to remove the portion of the audio data by removing the set of least significant bytes from each of a selected set of audio frames after encoding the audio input in response to measuring the bandwidth utilization.

12. The client device of claim 8, wherein the client device configured to measure bandwidth utilization measures the real-time bandwidth indicator selected from the group consisting of: IP buffer length, QoS degradation, RTCP receiver reports, and packet sent indication data.

13. The client device of claim 8, wherein the client device is further configured to:
receive the plurality of RTP data packets from the wireless communications network by a second client device;
augment the received plurality of RTP data packets with a plurality of dummy bits to reproduce the audio input;
decode the plurality of RTP data packets into the audio frames based on the set of parameters; and
reproduce the audio input based upon the audio frames on the second client device.

14. A client device enabled to transmit a plurality of RTP data packets based on an audio input over a wireless communications network in a communication session comprising:
a CODEC configured to create audio frames comprising audio data representative of an audio input based on a set of parameters;
a RTP queue coupled to the CODEC and configured to temporarily store the audio frames;
a queue manager configured to control the audio frames output from the RTP queue and further configured to remove audio data by removing audio frames from the RTP queue by:
removing audio data from a selected set of the plurality of RTP data packets in response to determining that a received real-time bandwidth utilization indicator is above one of a first pre-determined threshold, a second pre-determined threshold and a third pre-determined threshold, wherein removing the audio data comprises removing at least one of the audio frames, at least two of the audio frames and a set of least significant bytes;
wherein said queue manager provides a plurality of notification messages if the received real-time bandwidth utilization indicator exceeds the first pre-determined threshold, wherein the plurality of notification messages is provided by:
creating a first notification message upon removing the at least two of the audio frames from the plurality of RTP data packets if the bandwidth utilization is above the second pre-determined threshold;
creating a second notification message if the bandwidth utilization is above the second pre-determined threshold for a pre-determined time period;
terminating transmission of the plurality of RTP data packets upon expiry of a flow-off timer if the bandwidth utilization is above the third pre-determined threshold;
creating a third notification message upon terminating the transmission of the plurality of RTP data packets if the bandwidth utilization is above the third pre-determined threshold;
a UDP/IP stack configured to group the audio frames into a plurality of RTP data packets upon removing the audio data; and
a modem configured to transmit the plurality of RTP data packets over the communication network and to provide a real-time bandwidth utilization indicator to the queue manager.

15. The client device of claim 14, wherein the audio data is removed by removing the audio frames from a selected set of the plurality of RTP data packets in response to the real-time bandwidth utilization indicator.

16. The client device of claim 14, wherein the queue manager is further configured to remove the audio data by removing the at least some least significant bytes from the plurality of RTP data packets in response to the real-time bandwidth utilization indicator after encoding the audio input in response to measuring the bandwidth utilization.

* * * * *